(12) United States Patent
Dickins et al.

(10) Patent No.: US 10,334,362 B2
(45) Date of Patent: Jun. 25, 2019

(54) INTRINSICALLY SAFE AUDIO SYSTEM MANAGEMENT FOR CONFERENCE ROOMS

(71) Applicant: Dolby Laboratories Licensing Corporation, San Francisco, CA (US)

(72) Inventors: Glenn N. Dickins, Como (AU); Dong Shi, Shanghai (CN); Andrew Border, Los Altos, CA (US); David Gunawan, Sydney (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 5 days.

(21) Appl. No.: 15/803,456

(22) Filed: Nov. 3, 2017

(65) Prior Publication Data

US 2018/0132038 A1 May 10, 2018

Related U.S. Application Data

(60) Provisional application No. 62/423,363, filed on Nov. 17, 2016.

(30) Foreign Application Priority Data

Nov. 4, 2016 (WO) ................ PCT/CN2016/104534
Dec. 16, 2016 (EP) .................................... 16204787

(51) Int. Cl.
*H04R 3/02* (2006.01)
*H04R 29/00* (2006.01)
(Continued)

(52) U.S. Cl.
CPC ............ *H04R 3/02* (2013.01); *G10L 21/0232* (2013.01); *H04M 3/56* (2013.01); *H04N 7/147* (2013.01);
(Continued)

(58) Field of Classification Search
CPC ........ H04M 3/568; H04M 3/56; H04M 3/567; H04M 3/002; H04M 9/082; H04R 3/02;
(Continued)

(56) References Cited

U.S. PATENT DOCUMENTS 4,712,231 A 12/1987 Julstrom
4,965,822 A 10/1990 Williams
(Continued)

FOREIGN PATENT DOCUMENTS

WO 2016/130459 8/2016

OTHER PUBLICATIONS

Cisco, Echo Analysis of voice over IP, 2002.*
(Continued)

*Primary Examiner* — Davetta W Goins
*Assistant Examiner* — Kuassi A Ganmavo

(57) ABSTRACT

Systems and methods are described for analyzing and resolving feedback caused by having multiple audio links in a conference room. An audio system may detect the presence of duplicated audio caused by multiple audio links in the conference room. Marker signals may be injected into the conference room or over the network in response to detecting the duplicated audio. Echoes of the marker signals may be received, and the system may determine which case corresponds to the detected duplicated audio based on the received echo of the marker signals. Based on the determined case, operation of at least one of the speaker and the microphone may be modified. After the modification, audio playback in the conference room may be monitored to verify that far end audio playback is taking place and that the duplicated audio has been resolved.

20 Claims, 13 Drawing Sheets

(51) Int. Cl.

| | | |
|---|---|---|
| *G10L 21/0232* | (2013.01) | |
| *H04R 3/04* | (2006.01) | |
| *H04M 3/56* | (2006.01) | |
| *H04N 7/14* | (2006.01) | |
| *G10L 21/0208* | (2013.01) | |
| *H04M 9/08* | (2006.01) | |
| *H04R 27/00* | (2006.01) | |

(52) U.S. Cl.
CPC ............. *H04R 3/04* (2013.01); *H04R 29/001* (2013.01); *G10L 2021/02082* (2013.01); *H04M 9/082* (2013.01); *H04R 27/00* (2013.01)

(58) Field of Classification Search
CPC ..... H04R 3/04; H04R 29/001; G10L 21/0232; G10L 2021/02082; H04N 7/15
See application file for complete search history.

(56) References Cited

U.S. PATENT DOCUMENTS

| | | |
|---|---|---|
| 5,386,465 A | 1/1995 | Addeo |
| 5,666,407 A | 9/1997 | Pfeifer |
| 5,848,146 A | 12/1998 | Slattery |
| 6,049,607 A | 4/2000 | Marash |
| 6,282,176 B1 | 8/2001 | Hemkumar |
| 6,434,110 B1 | 8/2002 | Hemkumar |
| 6,459,942 B1 | 10/2002 | Markow |
| 6,618,481 B1 | 9/2003 | Schmidt |
| 6,768,914 B1 | 7/2004 | Garey |
| 6,798,881 B2 | 9/2004 | Thomasson |
| 6,963,642 B1 | 11/2005 | Thomasson |
| 7,764,783 B1 | 7/2010 | Pai |
| 8,290,142 B1 | 10/2012 | Lambert |
| 8,712,076 B2 | 4/2014 | Dickins |
| 8,804,977 B2 | 8/2014 | Neal |
| 9,173,025 B2 | 10/2015 | Dickins |
| 9,373,343 B2 | 6/2016 | Dickins |
| 2003/0031315 A1 | 2/2003 | Belt |
| 2006/0018459 A1 | 1/2006 | McCree |
| 2007/0050451 A1* | 3/2007 | Caspi ...................... H04M 3/56 709/204 |
| 2007/0266395 A1* | 11/2007 | Lee ........................ H04H 60/31 725/11 |
| 2007/0291918 A1* | 12/2007 | Diethorn ................ H04M 3/56 379/202.01 |
| 2008/0160976 A1* | 7/2008 | Virolainen ............. H04W 4/029 455/416 |
| 2010/0189274 A1 | 7/2010 | Thaden |
| 2011/0194685 A1 | 8/2011 | Van De Laar |
| 2012/0140965 A9 | 6/2012 | Jensen |
| 2012/0224707 A1* | 9/2012 | Kim ........................ H04W 4/21 381/56 |
| 2013/0106977 A1* | 5/2013 | Chu ........................ H04N 7/142 348/14.02 |
| 2014/0270150 A1 | 9/2014 | Garcia |
| 2014/0307590 A1* | 10/2014 | Dobbelaere ........... H04M 3/568 370/260 |
| 2014/0329511 A1* | 11/2014 | Vesa ....................... H04M 3/569 455/416 |
| 2015/0050967 A1* | 2/2015 | Bao ........................ H04M 9/082 455/570 |
| 2015/0117626 A1* | 4/2015 | Nord ..................... H04M 3/568 379/202.01 |
| 2015/0230025 A1* | 8/2015 | Loether ................ H05K 999/99 381/79 |
| 2016/0014373 A1* | 1/2016 | LaFata .................... H04N 7/152 348/14.08 |
| 2016/0111111 A1 | 4/2016 | Levitt |
| 2016/0189726 A1* | 6/2016 | Raniwala ................ G10L 21/02 704/227 |

OTHER PUBLICATIONS

Schmidt, Gerhard "Applications of Acoustic Echo Control—An Overview" Signal Processing Conference 12th European Vienna, Sep. 2004, pp. 9-16.

* cited by examiner

INTRINSICALLY SAFE AUDIO SYSTEM MANAGEMENT FOR CONFERENCE ROOMS

CROSS-REFERENCE TO RELATED APPLICATIONS

This application claims priority to PCT International Application No. PCT/CN2016/104534 filed Nov. 4, 2016 and U.S. Patent Application No. 62/423,363 filed Nov. 17, 2016 and European Patent Application No. 16204787.2 filed Dec. 16, 2016 which are hereby incorporated by reference in their entirety.

FIELD OF INVENTION

U.S. Embodiments herein relate generally to audio signal processing, and more specifically to dynamic adjustment of audio input and output in response to detecting problematic duplicate audio and/or feedback paths of audio.

SUMMARY OF THE INVENTION

Systems and methods are described for analyzing and resolving feedback caused by having multiple audio links in a conference room. An audio system may detect presence of duplicated audio caused by multiple audio links in the conference room. Marker signals may be injected in response to detecting the duplicated audio. The marker signals may be received, and the system may determine which case corresponds to the detected duplicated audio based on the received marker signals. Based on the determined case, operation of at least one of a speaker and a microphone of the audio system may be modified. After the modification, audio playback in the conference room may be monitored to verify that far end audio playback is taking place and that the duplicated audio has been resolved.

In an example, the marker signals are injected into the conference room using speakers coupled to the audio system, and the marker signals are received by the microphone.

Another embodiment of the present invention includes an audio system controller. The audio system controller may include a room port, including a room input link and a room output link, and a network port that includes a network input link and a network output link. An audio routing controller may also be included that is communicatively coupled to both the room port and the network port. The audio routing controller may include a processor that receives an incoming audio stream via the network input link and outputs the audio stream via the room output link. The processor may be configured to detect duplicate audio in a conference room via the room input link and inject marker signals in one of the room output link and the network output link. The audio routing controller may receive the injected marker signals via one of the room input link and the network input link, and determine, based on the received marker signals, which case of a plurality of cases corresponds to the detected duplicate audio. The audio system controller may then modify operation of the room port and/or network port based on the determined case corresponding to the detected duplicated audio, and monitor audio playback in the conference room to verify that far end audio playback is taking place and that the duplicated audio has been resolved.

In the foregoing embodiments, the determining which case of the plurality of cases may include determining an amount of delay between the injecting the marker signals and detecting the injected marker signals using one of the room input link and the network input link. Various cases may correspond to different amounts of detected delay, and each case may have a case-specific modification to the operation of the room port implemented by the audio system controller.

BRIEF DESCRIPTION OF THE FIGURES

This disclosure is illustrated by way of example and not limitation in the figures of the accompanying drawings, in which like references indicate similar elements, and in which.

DETAILED DESCRIPTION

Conference rooms may support multiple forms of audio connectivity to integrate with existing conference systems. When additional devices are brought into a room which also have links to such systems, a geometric complexity problem may be created. This may have undesirable effects, such as potential circulation of audio (feedback through a conferencing system) and/or isolation of certain participants. Embodiments of a system in control of at least one of the audio input and output connections in a room or conferencing installation are described. Through a set of components for monitoring and probing the various potential audio and network paths, the described intrinsically safe audio system is able to reduce the possibility of ongoing audio circulation, and provide direct audio feedback to the users of the system to correct or improve the conferencing configuration. By allowing a audio system to self-correct for the circulating audio, a more effective and efficient solution may be found than human intervention, lowering frustration and time lost to conference instantiation.

Installed conference room systems are becoming an integral part of the office working environment. Such rooms typically support both audio and video, with the ability to route the source of content from conferencing systems, laptops and other devices and local media playback devices. Also, at any conference, there is a tendency for users to bring in additional laptops and devices. All of these systems may be individually or collectively bringing media into the room for consumption and collaboration, and in many cases this media includes connecting to remote sites and participants.

However, additional devices connecting to the same remote site may create an immediate and often debilitating problem where there can be multiple independent audio paths connecting between two sites, or creating a circulating connection into a single site. The symptoms of this problem range from subtle echo, through to highly disruptive delayed audio and in severe cases a chaotic feedback howl that renders the audio connection useless. This situation of instability can happen quickly and unexpectedly when someone connects or adds an additional service or connection in the conference room. The situation is compounded when the impairment of the audio connectivity between the sites isolates the groups and prevents the communication necessary to resolve the issue. What follows is usually a comedy or tragedy of alternating between systems, audio mute, speaker volumes, and reconnections until communications is effectively established.

Figure 1A:
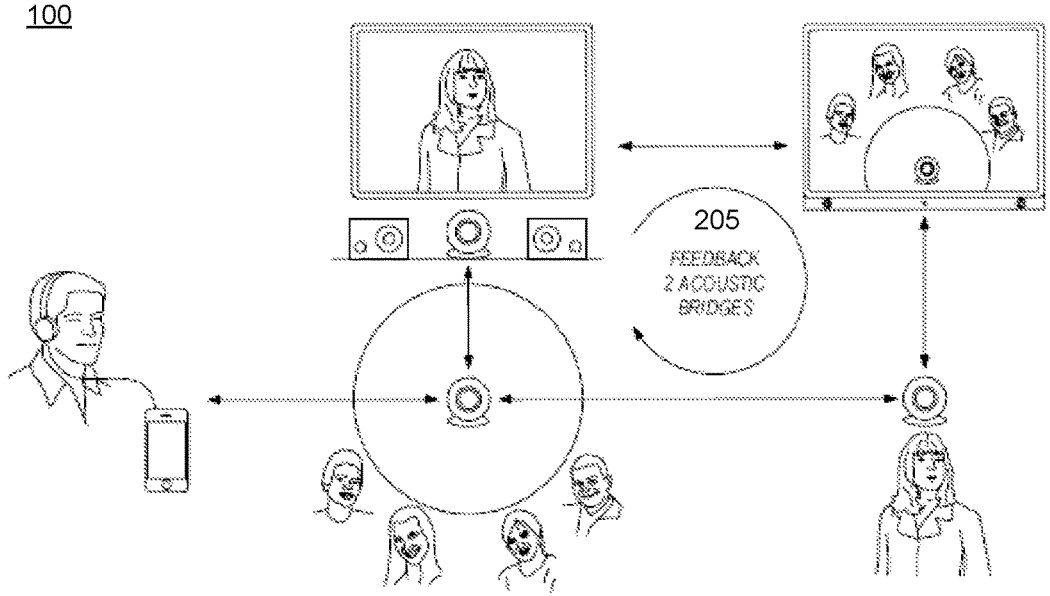
FIGS. 1A-B show schematic plan views of an audio system in a conference room illustrating example duplicate audio causing feedback, in various embodiments.
Figure 1B:
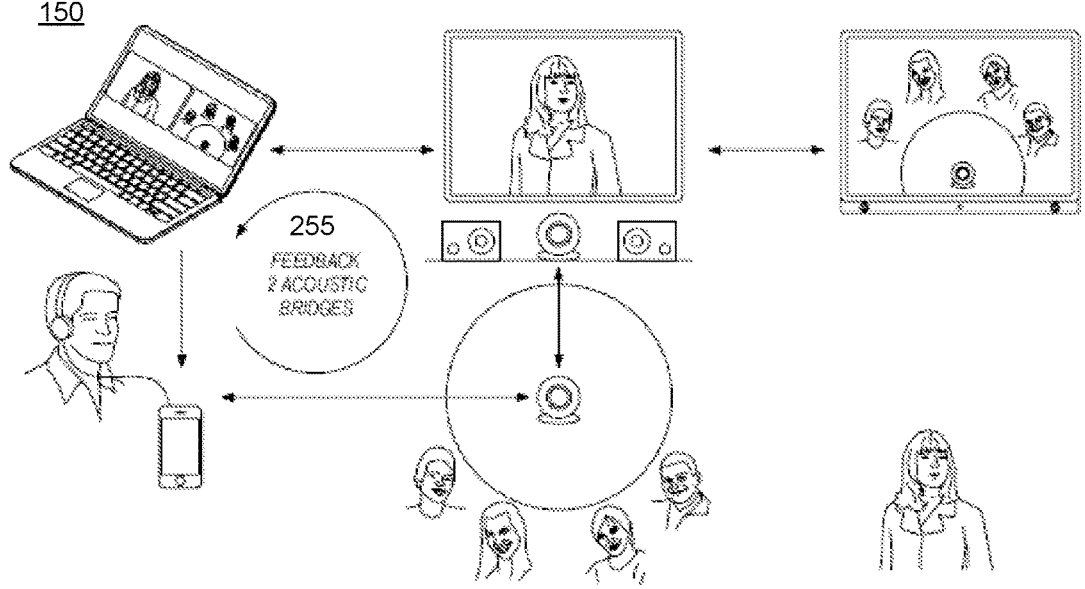

FIGS. 1A-B show schematic plan views of an audio system in a conference room illustrating example duplicate audio causing feedback, in various embodiments. The exemplary conference rooms 100 and 150 each include a video conferencing system (which naturally includes audio), and some additional premium or highly accessible audio conferencing system. As seen in FIGS. 1A-B, there is a situation of multiple connectivity tools in place simultaneously. Both a video conferencing system and premium audio conferencing tool are in use. Depending on which endpoints are using which audio connection, there is a range of outcomes—from catastrophic audio feedback, to sub-optimal-but-functional audio coupling, and then an ideal case where the highest quality audio experience is had by the largest number of participants. Conventional systems with echo suppression may eventually adapt to the severe circulating noise and somewhat correct it by suppressing the feedback paths. However, when performed in a naïve way by a single audio subsystem, this tends to be a temporary solution, and echo may return as soon as a sound is made by the users.

FIG. 1A shows three endpoints in a conference using a combination of video and audio-only conferencing system. When a premium audio service, such as a spatial conference phone, is activated in the left endpoint in scenario 100, two acoustic bridges are created, and feedback 105 may almost immediately and catastrophically set in.

FIG. 1B illustrates a similar situation 150, where the leftmost endpoint includes a laptop connecting to the video system. The acoustic bridge may only be in one direction, as the headphone output is unlikely to couple back into the laptop video system. However, the laptop audio may still be sufficient to cause problematic feedback 155. The problems in scenarios 100 and 150 may be resolved if all participants mute the microphones or speakers of their respective video systems. However, much disruption of the conference may occur, as users are required to disable audio on each of the video systems. Also, newcomers to the conference may be denied access to audio participation in the conference, unless they have access to the premium audio connection. This could be partially resolved by enabling audio on one of the video systems, but in addition to the disruption caused by adjusting the audio systems, an acoustic bridge would be created between the two systems, which may be detrimental to sound quality.

Three main vectors around the proposed audio system controller described herein include: a) identifying issues of nearby talkers and suggesting or changing the conference audio connectivity to avoid nuisance duplicated audio to participants; b) monitoring the activity of a given endpoint and the remainder of the conference in order to selectively control microphone input coupling and speaker output level in order to achieve the best full duplex performance and low transmission of nuisance; and c) provide an intelligent system for controlling multiple points of audio routing in and out of a room connected to one or more conferencing systems in order to prevent problematic duplicate and feedback paths of audio. As used herein, full duplex operation or performance refers to both local capture and far-end audio playback of a device operating substantially at the same time.

This invention proposes a novel design for the component that typically manages the audio connection, multiplexing and routing in a conference room installation. As will be shown, this is a very effective point to add a system that can monitor, react and advise in situations where there is a problematic duplication of audio connectivity. Additionally, for high end rooms with AV connectivity and automation, there is generally a system for controlling and routing audio output and input in the room. Such systems may include user volume, selection, required mixing and pre-processing (noise removal, beamforming, echo control). Such room audio control systems would have the required connectivity and signal processing capabilities to implement this suggested invention and functionality.

Conventional approaches would suggest that the management of echo is restricted to the case where there is a reliable reference of the sent audio that can be used to adaptively identify the echo path. This thinking arises from the academic framing of echo cancellation, and does not reflect the current possibilities and more robust algorithms created for severe non-linear and poorly aligned reference echo. Additionally, in considering the even more challenging domain of managing feedback nodes in the complete audio system path that are unknown and beyond the system's direct control, very little work has been successfully proposed or implemented in this space. Conventional thinking would suggest that such problems are endemic and can only be resolved by intelligent and external agents—that is, leaving it to the users at each endpoint to work out the cause and resolve it. Again the key problem here is that when multiple agents start manually changing the configuration of audio systems, issues of disconnection and audio isolation may result.

In the case of a vendor of a premium audio service without video, this is a fundamental barrier for adoption in the room-installed case—therefore the idea of embodying the intelligent agent into the room audio subsystem itself is an appealing proposition. There is also a more general case where there may be only one audio service, though laptops and users entering a conference room whilst already on a mobile device creates an audio feedback problem that disrupts the conference.

The present invention relates to an audiovisual system having the following characteristics:
- routing and control of one or more speakers and microphones in a room installation (or embodied in a particular device);
- the ability to intercept or divert audio being played out or captured from the room;
- connection to one or more conferencing systems for which at least one has an audio connectivity component;
- potential for an audio connection either outbound or inbound from some other site to be repeated through either of:
  - multiple communications systems connected and controlled directly, or
  - additional communication systems that are not connected or controlled that may be present or brought into the room and sporadically enabled by users.

As stated above, multiple audio paths can create duplicated audio, and in extreme cases catastrophic circular build up of echo. The presented functions and operation of the present invention as shown in subsequent embodiments include:
- the detection of multiple acoustic bridges or complex circulation of audio involving more than one endpoint in the feedback path (such as scenarios 100 and 150);
- the ability to somewhat suppress the impact of short duration unsuitable acoustical bridging in order to facilitate continued audio communication between the sites as the problem is rectified;
- use of the detection of feedback paths and intelligent decision heuristics to create potential solutions to the problem;
- use of selective audio feedback to the users of the system:
  - to notify of the existence and likely cause of a problem;
  - to inform any changes to audio selection and connectivity that have been automatically carried out in order to resolve the issue; and
  - to provide suggested corrective action to the users in order to resolve the issue and achieve the best quality experience of all participants;
- use ongoing audio activity dependent signal routing to achieve sustainable operation in a half duplex or partial bridging sense, to test and ensure that all participants are receiving some audio; and
- where there are multiple instances of this same invention at different endpoints, use in-band audio signaling, or mediated network connectivity, such that the multiple endpoints can work collectively to ensure that there is only one bridge occurring between each of the audio conferencing systems in use.

Figure 2:
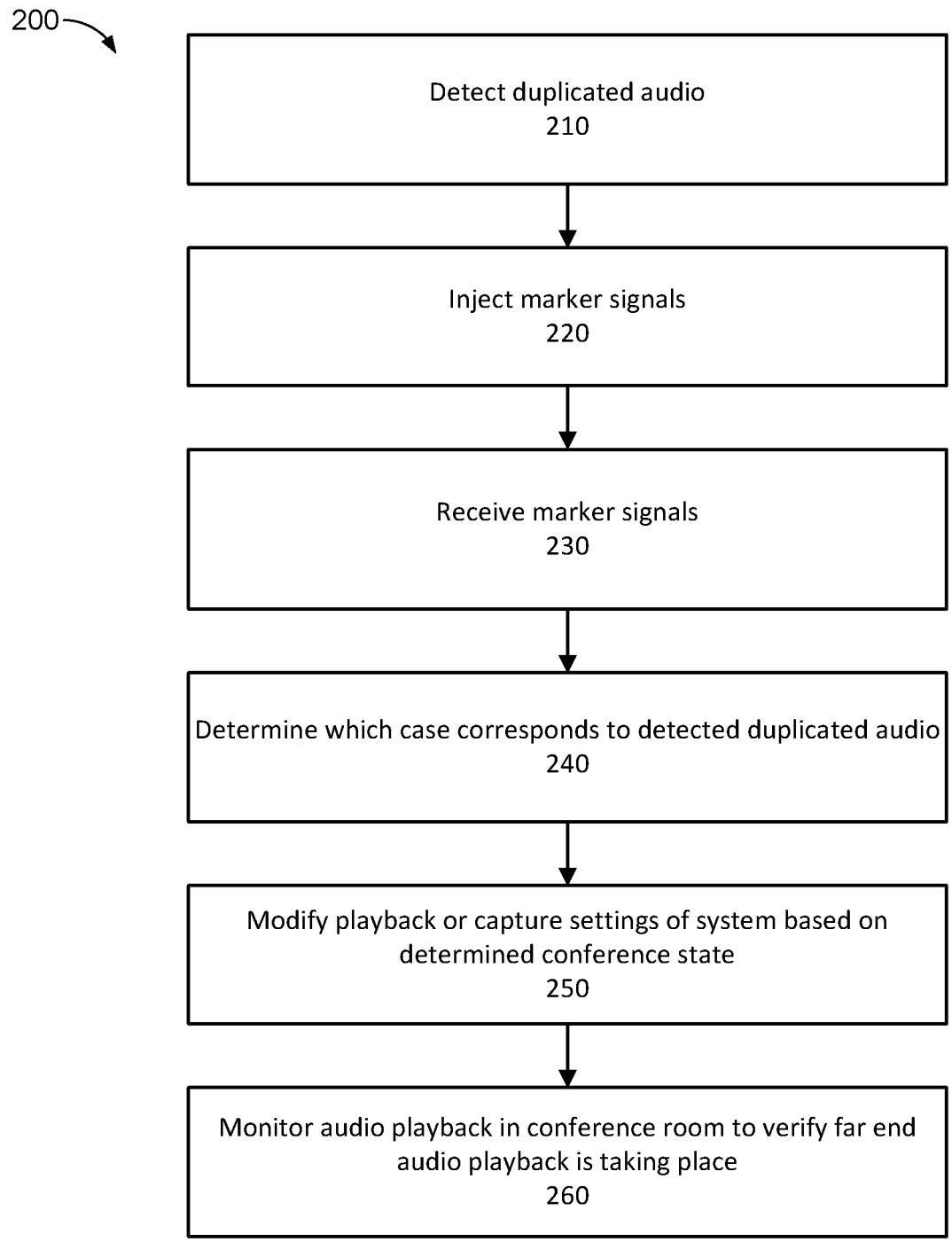
FIG. 2 shows a flow diagram for a method for analyzing and resolving feedback caused by having multiple audio links in a conference room, in an embodiment.
Figure 3:
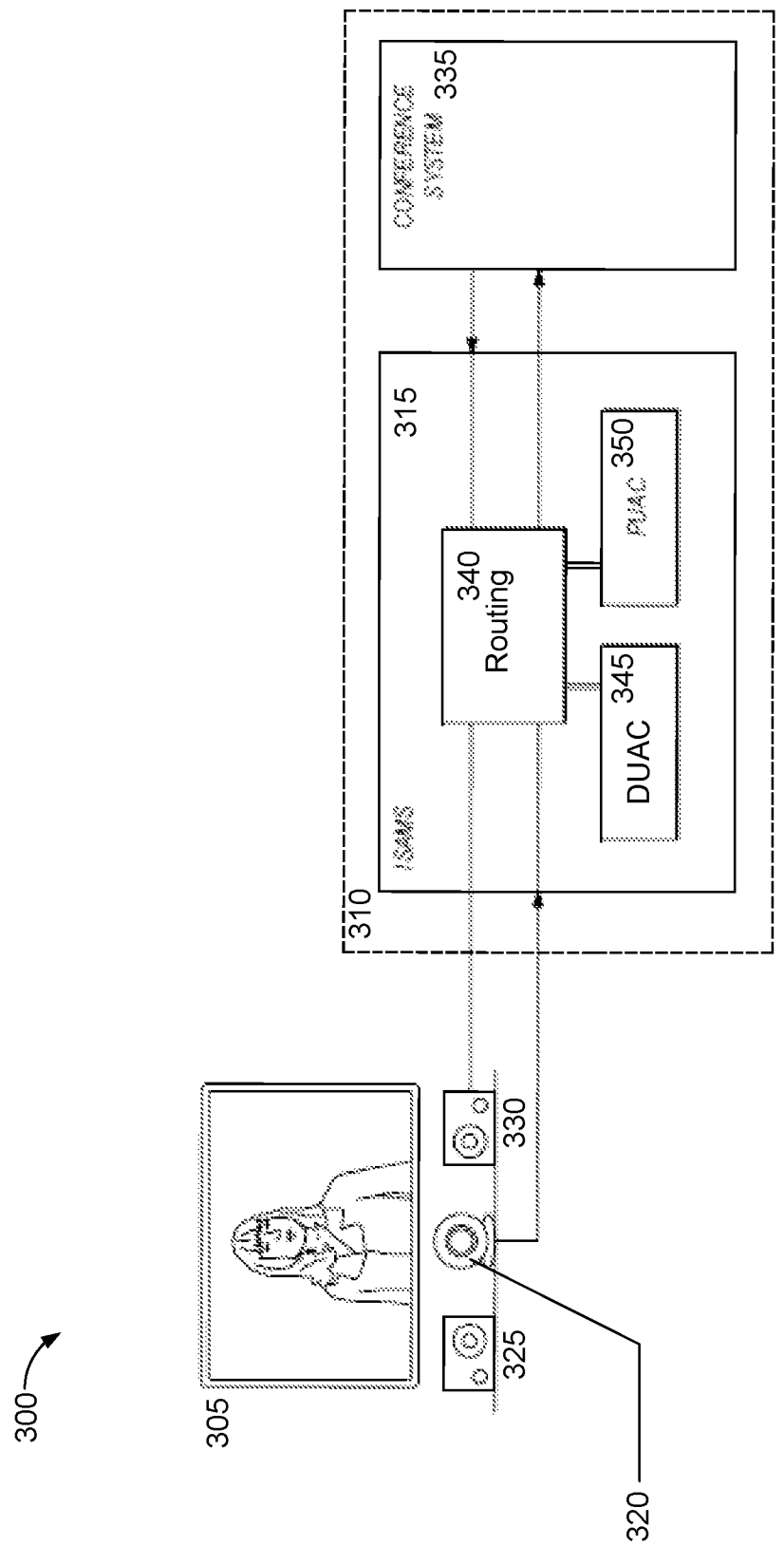
FIG. 3 shows a simplified block diagram of a system for analyzing and resolving feedback caused by having multiple audio links in a conference room, in an embodiment.

FIG. 2 shows a flow diagram for method 200 for analyzing and resolving feedback caused by having multiple audio links in a conference room, in an embodiment. FIG. 3 shows a simplified block diagram of a system 300 for analyzing and resolving feedback caused by having multiple audio links in a conference room, in an embodiment. Exemplary system 300 includes audio system controller 315 (also referred to as "intrinsically safe audio management system" or "ISAMS"), which is communicatively coupled to conference system 335 over a network. Audio system controller 315 may also be communicatively coupled to speakers 325 and 330 and microphone 320 of a conference room video conferencing system 305. The audio system controller 315 may include audio routing controller 340, and detection of unsafe audio connectivity ("DUAC") and probe of unsafe audio connectivity ("PUAC") circuits or components.

In method 200, an audio system controller (such as audio system controller 325) detects presence of duplicated audio caused by multiple audio links in the conference room at step 210. As shown in FIG. 3, it is assumed the audio system controller 315 has access to at least one set of audio output (speakers) and input (microphones) in a room, and is managing at least one connection to an audio connectivity/communications/conferencing system. Using the connections to the room and the network, the audio system controller 315 may detect aberrant behavior or sudden system audio path changes that signal a problematic condition.

Using speakers coupled to the audio system, marker signals may be injected, into the conference room and/or into the network connection, in response to detecting the duplicated audio at step 220. As will be shown below, in many cases different underlying problem may present similar feedback or audio signal behavior as seen by the audio system controller 315. In order to take an appropriate corrective or informative action as set out below, it is critical to best resolve and/or disambiguate which problem case is occurring. The audio system controller 315 may disambiguate the problem by selectively injecting marker signals into different audio and network paths to see where the problem is occurring. The marker signals may be received by the audio system controller at step 230. The way the marker signals are received may depend on how the marker signals were injected. For example, a marker signal sent via speakers into the conference environment may be received over the network connection. Likewise, a marker signal sent via the network connection may be received by the microphone of the audio system. The audio system controller may determine which case corresponds to the detected duplicated audio based on the received marker signals at step 240.

Based on the determined case, operation of at least one of the speaker and the microphone may be modified at step 250. As discussed above, the feedback problem may be halted by removing one conference link from the conference room. Since the audio system controller 315 has at least one conference link, the audio system controller 315 can therefore mute its own microphones or speakers in order to stop the catastrophic feedback that would otherwise render a large set of conference users isolated by lock-out. In all the cases presented below, there is an audio routing action that stops the complete audio feedback path. Once the case related to the cause of the duplicated audio is determined in step 240, then there will be a more specific corrective action suggested that can stop the feedback. The specific corrective action may be an ongoing action, by the audio system controller 315, and/or through the activity of a tasked user (for example, muting another system that has been enabled in the room).

When playback or capture settings are modified, it is important to maintain connectivity between the parties of the conference. For example, by muting audio input from the present room it may be possible to stop a feedback loop, but immediately the people in the conference room cannot communicate over audio with others. The described audio system controller 315 may, in some embodiments, use adaptive suppressive filters to maintain audio connectivity sufficiently to permit a better solution to be determined for all endpoints involved. This is a form of adaptive feedback suppression may allow for audio passing through the system when not subject to the loop. In the simplest sense, modifications provided by the adaptive suppressive filters may involve lowering the volume of the audio system controller 315 output such that far end playback can still be heard. In doing so, the feedback path may be maintained within a stable loop gain, and thus audio system controller 315 may avoid creation of 'howl' or build up to a catastrophic level. Echo that is created by the adaptive suppressive filters may be undesirable but does not isolate participants by jamming the system, as would be the case in conventional conferencing systems.

In some embodiments, the modification to playback or capture settings may be accompanied by system-provided guidance and instruction to better resolve the duplicated audio-related problems. For example, some aspects of this may include:

- notifying the users in a room that a second output device has been detected;
- notifying the users in a room that a second capture device or link to an active conference has been detected;
- notifying the local users that the ISAMS-controlled microphone 320 has been muted;
- notifying the local users that the ISAMS-controlled speakers 325 and 330 have been lowered or muted;
- notifying the far end of the conference that the ISAMS-controlled microphone 320 in the room has been disabled; and
- notifying the far end of the conference that the ISAMS-controlled speakers 325 and 330 in the room have been lowered.

After the modification, audio playback in the conference room may be monitored to verify that far end audio playback is taking place and that the duplicated audio has been resolved at step 260. The audio system controller 315 has an ability to supervise the activity to see that there is an appropriate degree of audio connectivity after the playback or capture settings have been modified. For example, in the case that the audio system controller 315 is interrupting one or more paths between the room and connected conferencing systems, the audio system controller 315 is still able to monitor the audio in the disrupted path. If the speakers 325 and 330 controlled by the audio system controller 315 are muted, audio system controller 315 can still ensure that audio coming in from a conference that would have been played out the speakers is actually being played into the room by some other method. Also, in the case if the microphone 320 is muted and not sending to a conference, the audio system controller 315 can monitor the far-end conference to ensure that audio in the local room is entering the remote conference in some form, due to another method or connection.

Figure 4:
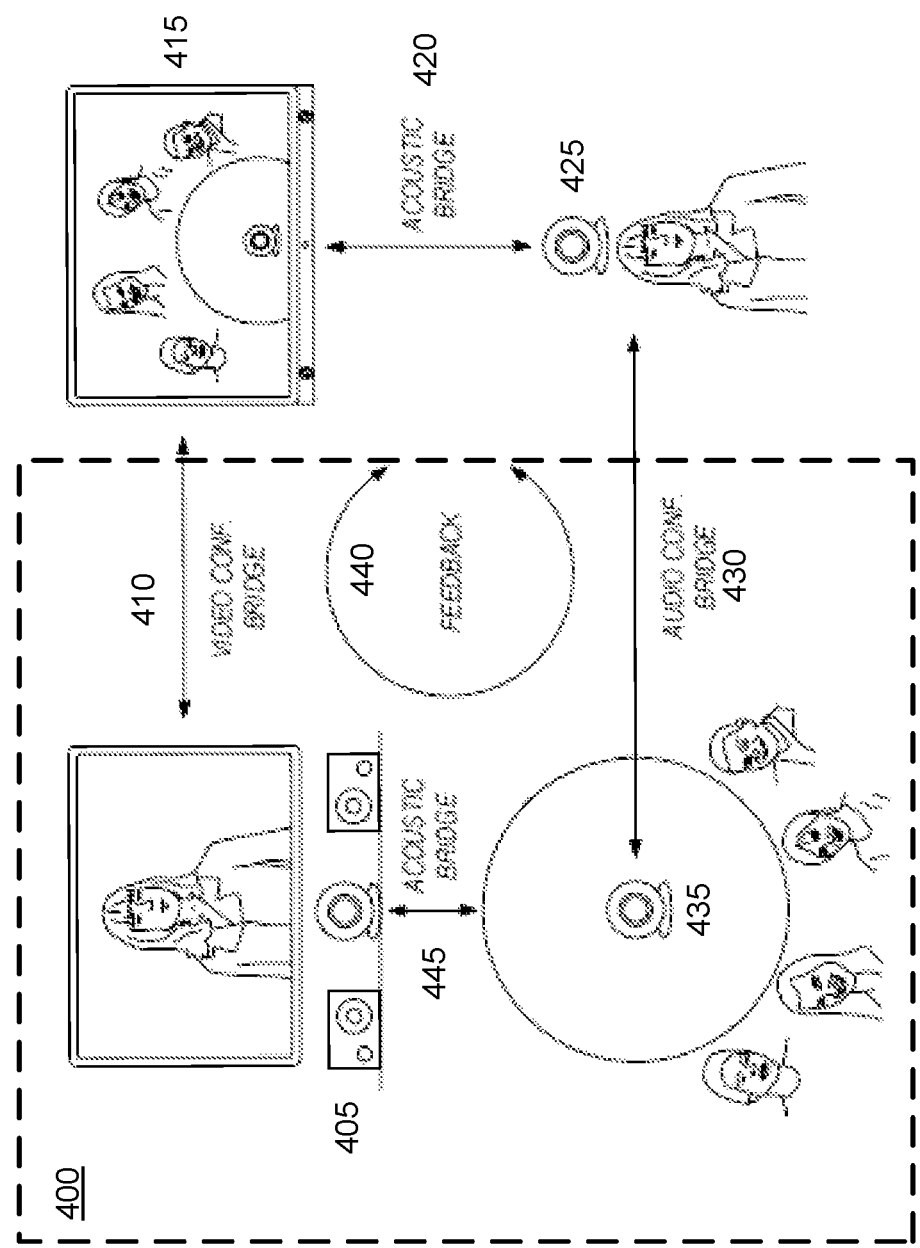
FIG. 4 shows a schematic plan view of an audio system in a conference room illustrating example duplicate audio causing feedback, in an exemplary embodiment.

An example of how the audio system controller 315 may resolve the feedback caused by duplicated audio is shown in FIG. 4. FIG. 4 shows a schematic plan view of an audio system in a conference room 400 illustrating example duplicate audio causing feedback, in an exemplary embodiment. A large conferencing room may have an installed audio video conferencing system 405 that includes the audio system controller 315. The installed conferencing system 405 may have a connection to a standard telephony network which can be used for voice conferencing. Without loss of generality, audio system controller 315 may be an insert into the audio control of the microphones and speakers related to the in room video conferencing system (e.g. conferencing system 405). In various embodiments, the audio system controller 315 may be incorporated into the communications device of the conferencing system 405 itself, rather than an external insert.

The conference audio may be provided by an enhanced service, for example BT, for which the conference room also has a dedicated peripheral 435 on the table not managed by the audio system controller 315. The users in the room recognize the possibility of better audio and dial in the conference phone 435, in addition to having the existing connection through installed conferencing system 405. Immediately as the connection is made, there may be catastrophic echo as both the installed conferencing system 405 and device 435 in the room are connected to the same conference and are not cooperating as a single endpoint. The room and all users of the conference may be quickly assaulted with an audio build up. The signal processing on the installed conferencing system 405 may work to suppress this, but in doing so may remove the ability to communicate out of the current room.

In response, using the method 100, the audio system controller 315 may detect the large additional and increasing echo occurring as the duplicated circulating audio 440 becomes highly correlated. On sending a probe pulse to the network only (e.g., via video conference bridge 410), the audio system controller 315 may determine that the probe pulse is heard at a suitable level in the room. On sending a second probe pulse into the room only (e.g., via acoustic bridge 445), the audio system controller 315 may detect the second probe pulse coming back over the network, via audio conference bridge 430. In both the case of an echo coming from a signal broadcast to the network and the case of an echo coming from a signal sent to the room, the delay of the returned signal may be of the order of >300 ms, indicating the feedback is occurring through the conferencing system 405.

The second probe, sent only to the room, may discover that duplicated audio in the room was entering the conference, and audio from the conference was being played in the room. At this point, the audio system controller 315 may immediately, in response to the determining that the feedback is occurring through the conferencing system 405, reduce the volume of or stop both the microphone and speakers of the conferencing system 405. This stops the feedback loop 440, effectively disabling the audio system controller's connection through the conventional phone line to the conference. Meanwhile, there remains sufficient connectivity for the room, through device 435, to continue communications with the conference. In some embodiments, the conferencing system 405 may announce, to the conferencing room 400, that a substantive additional conferencing endpoint has been detected, and the room connection and conference system are temporarily disabled.

By continuing to observe both the incoming conference (over the video conference bridge 410) to the audio system controller and room capture (e.g., over acoustic bridge 445), the audio system controller 315 may preserve audio connectivity to the conference. If the user disconnects the connection to the conference using device 435, the audio in the room 400 will no longer reflect some level of the far-end activity. Because the audio system controller 315 is monitoring the audio playback in the conference room 400, the audio system controller 315 may detect the absence of audio playback, announce that modified operation is being undone, and remove the mute of microphones and speaker. Undoing modified operation of the conference system 405 may be best performed on the incoming audio, and the audio system controller may not, in an embodiment, automatically unmute audio capture in the room if it is not being heard on the conference. Unmuting audio capture in the room could override a user-selected mute of the second system, for example, and be embarrassing. Therefore the system may have different thresholds and actions—unmute the speakers if there is activity on the conference no longer being heard in the room, and notify the room if there is what looks like an attempt to talk in the room that is not turning up on the remote conference.

Returning to FIG. 3, the audio system controller 315 may include audio routing controller 340. Audio routing controller 340 may intercept and route audio between the existing conference system and the audio transducers (speakers 325 and 330 and microphones 320) in the room. The audio routing controller 340 is able to control the connections and gains between all components, and also able to route in synthetic audio in the form of voice prompts and announcements.

Generally where conference systems are mediated by the server or network, the feedback path introduced by another device in the room (with audio loop through the network) may be much longer in time than acoustic echo in terms of the first echo path. For example, an audio echo path would be seen within the dimensions of the room, perhaps 4-6 m, corresponding to 20 ms delay. For any typical pass through the network, suggesting a second device has been enabled, an echo delay of the order of 50-100 ms minimum may also be present. The DUAC 345 may include circuitry or instructions to monitor and detect the delay of echo, which may signify the presence of duplicated audio in the conference room.

When the DUAC 345 identifies the presence of duplicated audio, the problem becomes resolving the type of condition that is causing it. When there is circulating audio, it becomes very difficult to determine the causality—that is, from what transmission is there a returning echo, or what capture in the room being transmitted is causing a circulant path. PUAC 350 is able to selectively disconnect various audio paths into and out of the room from the conferencing system 305, and simultaneously inject unique marker tones that assist in determining the nature of the unsafe connectivity. Given that the unsafe path is occurring with delays of the order of 50-1000 ms, PUAC 350 is able to disconnect the audio for a brief moment in order to resolve the ambiguity and to determine the best course of action. Such disconnection may further interrupt the conference; however the automated system of audio system controller 315 may still be far more effective and faster than human intervention. Furthermore, the selective blocking of audio linkage to the conference system 305 will put a stop to what was likely increasing circulant audio activity.

While one audio conferencing system 305 is shown in conference room 300, some conference rooms may have connection to several audio conferencing systems. A particularly common example of this is a room with a video conferencing system that also has the ability to connect the room into a normal phone system. Such a phone system may then call out to a conferencing bridge, on which other sites may be connected in addition to the video conferencing system.

Figure 5:
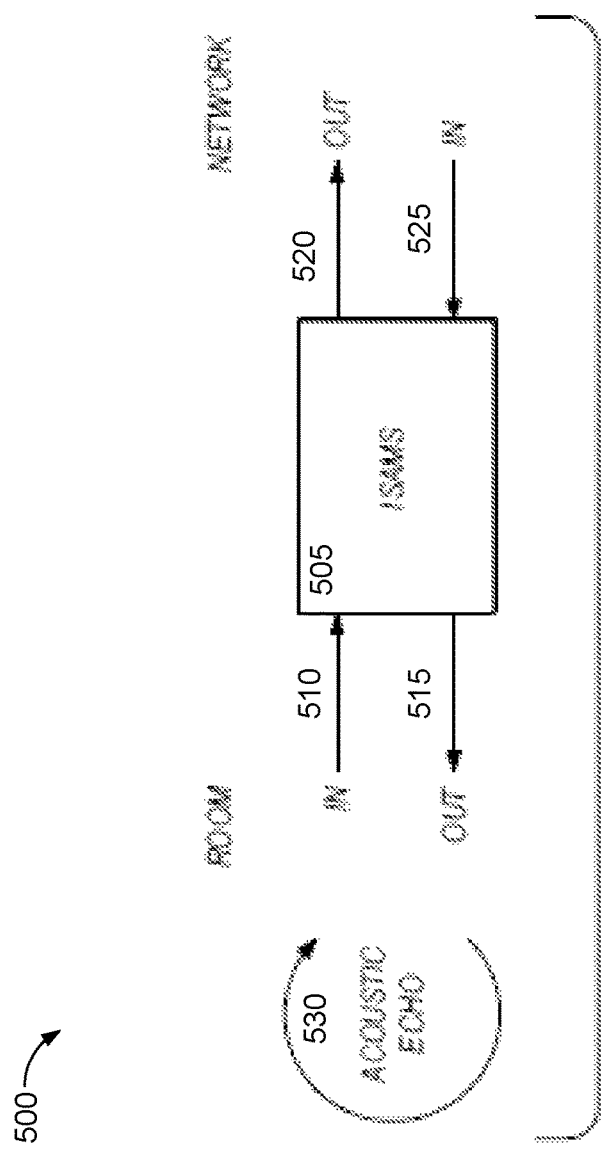
FIG. 5 shows a simplified block diagram of an audio system controller in a system for analyzing and resolving feedback caused by duplicate audio, in an embodiment.

For each additional conferencing connection, there may be a quadratic increase in the number of potential paths to check. For example, with two conference connections in a single room, the video conferencing system 305 will have two network destinations and sources NO1, NI1 and NO2, NI2. This gives a total of nine paths to monitor and potentially probe. Generally, however, the conference system may be considered stable, in that it is normally operational, until an additional device or loop forms by duplicating one conference and room link. In this case, the overall system is then considered as a connection between two audio systems—where one is the combination and link of the operational systems, and the second is the duplicate link to one of the conference systems. The general approach to probing each of the links can be extended from perspective fairly easily. Focusing on detection of duplicated audio, an embodiment of the audio system controller includes a set of adaptive filters monitoring the signal or signal envelope time-spectral correlation. Such adaptive filters are generally known as echo cancellers or echo suppressors and may include an estimation of the feedback path occurring between an output of the audio system controller and an input audio signal. A simple diagram of an audio system controller with only one network or conference connection is shown in FIG. 5. Audio system controller 505 includes two ports: a room port and a network port. The room port may include an input link 510 ("RI") and an output link 515 ("RO"), and the network port may likewise include an input link 525 ("NI," generally receiving far-end audio to transmit to room output link 515) and output link 520 ("NO," generally for transmitting audio captured via the room input link 510 to the far end of the conference). For example, the RO 515 may include one or more speakers in the conference room and/or the RI 510 may include one or more microphones in the conference room.

The following table now describes the different expected and aberrant activity on the set of four potential feedback paths from each of the two outputs of the audio system controller 505 to each of the two inputs. Normally, the audio system controller 505 will be connecting RI→NO and NI→RO and processing to remove any feedback from RO→RI. In an embodiment, a DUAC 345 may apply adaptive filter prediction on each of the paths as shown in FIG. 5. Where there is activity or echo path identified for a predetermined period of time (e.g., longer than 500 ms, greater than 300 ms, etc.) this may be a strong indication of an issue that should be disambiguated as set out in Table 1.

TABLE 1

Detection cases and suggested probe marker signals.

| OUT | IN | Delay | Cause | Detail and Probe |
|---|---|---|---|---|
| Room | Room | 100-500 ms | Normal Echo | The acoustic room response without duplicated audio- this is learnt and usually slow varying |
| Room | Room | <100 ms | Excess echo Another Speaker | Enough to throw AEC significantly - more than if something moved Suggests another speaker on same conference. Probe RO - RI ensuring the RO is independent of conference. This will reveal the room echo path independent of any potential loop and resolve if it is an echo change (e.g. device movement) or a potential additional device. |

TABLE 1-continued

Detection cases and suggested probe marker signals.

| OUT | IN | Delay | Cause | Detail and Probe |
|---|---|---|---|---|
| | | >300 ms | Late echo | Some-one else has created a loop. If there is not this feedback coming back in on the network, then it is an independent loop that cannot be resolved. Something in the room is duplex connected to a feedback loop. Probe with sending a RO with RI→NO blocked temporarily. |
| Room | Network | <100 ms | Catastropic | This is generally not possible without some recycling correlated audio messing with the detector. |
| | | >200 ms | Another Mic | The audio in the room is being picked up and sent to the conference without any echo control. This suggests an independent conference client with microphone picking up the ISAMS speaker (RO). Probe by Can test by sending specific RO independent of conference and test for that on NI. We could also test that a NO-NI |
| Network | Room | <100 ms | Catastrophic | Recycling sound is creating spurious acuasal echo identification. Approach would be to mute microphone and speakers prior to performing a set of probes. |
| | | >200 ms | Another Speaker | A speaker in the room is playing the conference audio. Probe NO→RI and see if an artificially introduced sound sent out comes back into the room via another client. |
| Network | Network | <100 ms | Catastrophic | Turn off and then selectively enable mic or speaker, or probes |
| | | >200 ms | Mic in Room Far End Echo | This could have two cases, since the NO is typically RI. Thus it could be a microphone enabled in the room (something we can fix) or far end echo (something we cannot fix but maybe able to reduce the impact of). Probe NO→NI sending something unique to the network and see if there is echo will test for the far end echo. A probe of RO→NI would test for another microphone in the room. |
| | Network | Build Up | Loop Elsewhere | Mitigate by turning down - generally look for problematic howl and turn down our speaker. Useful both whilst others resolve the issue or as a safety catch all if we happen to be part of the cause. |

Figure 6:
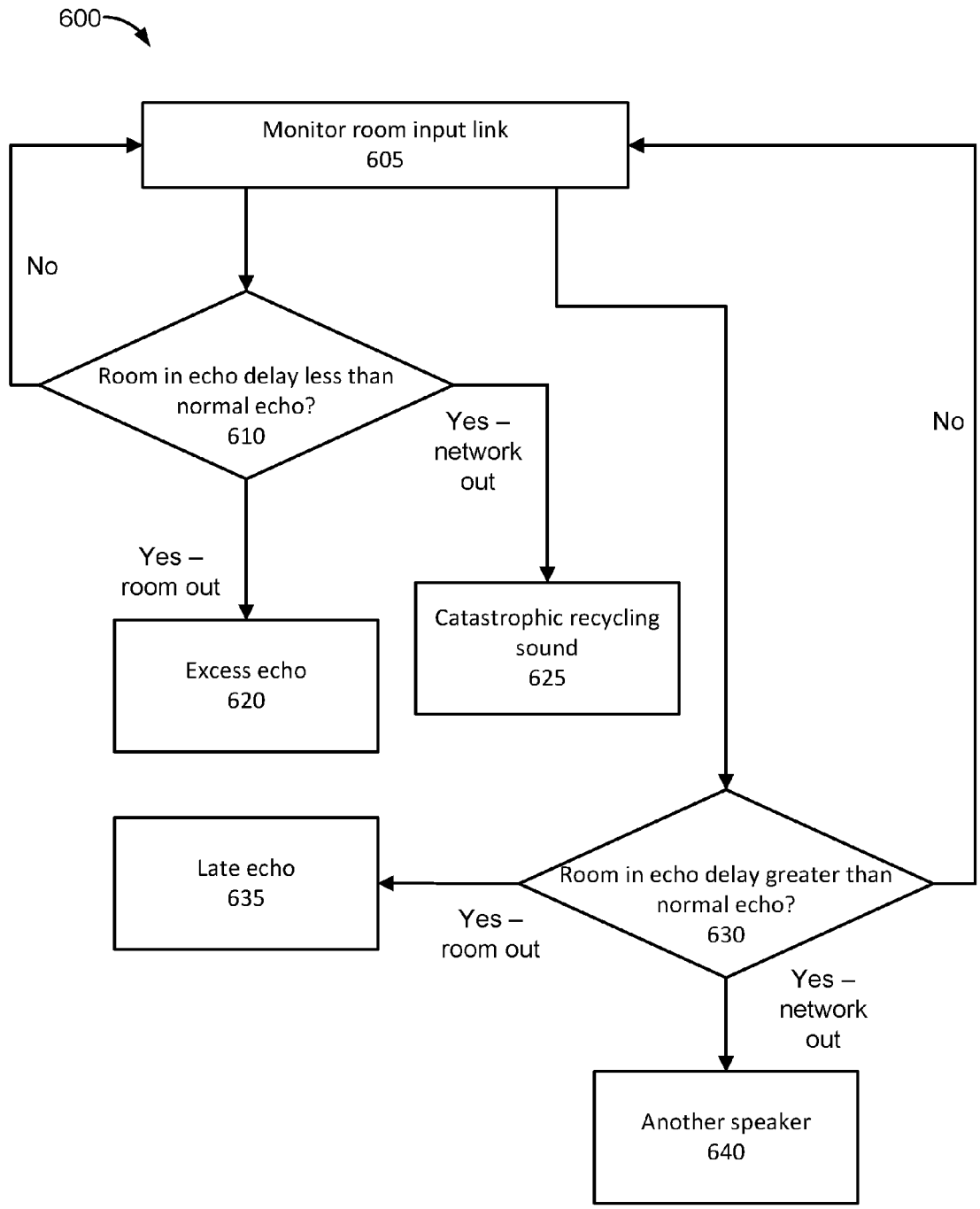
FIG. 6 shows a flow diagram for a method for determining which case, of a plurality of cases, corresponds to detected duplicate audio in an embodiment.
Figure 7:
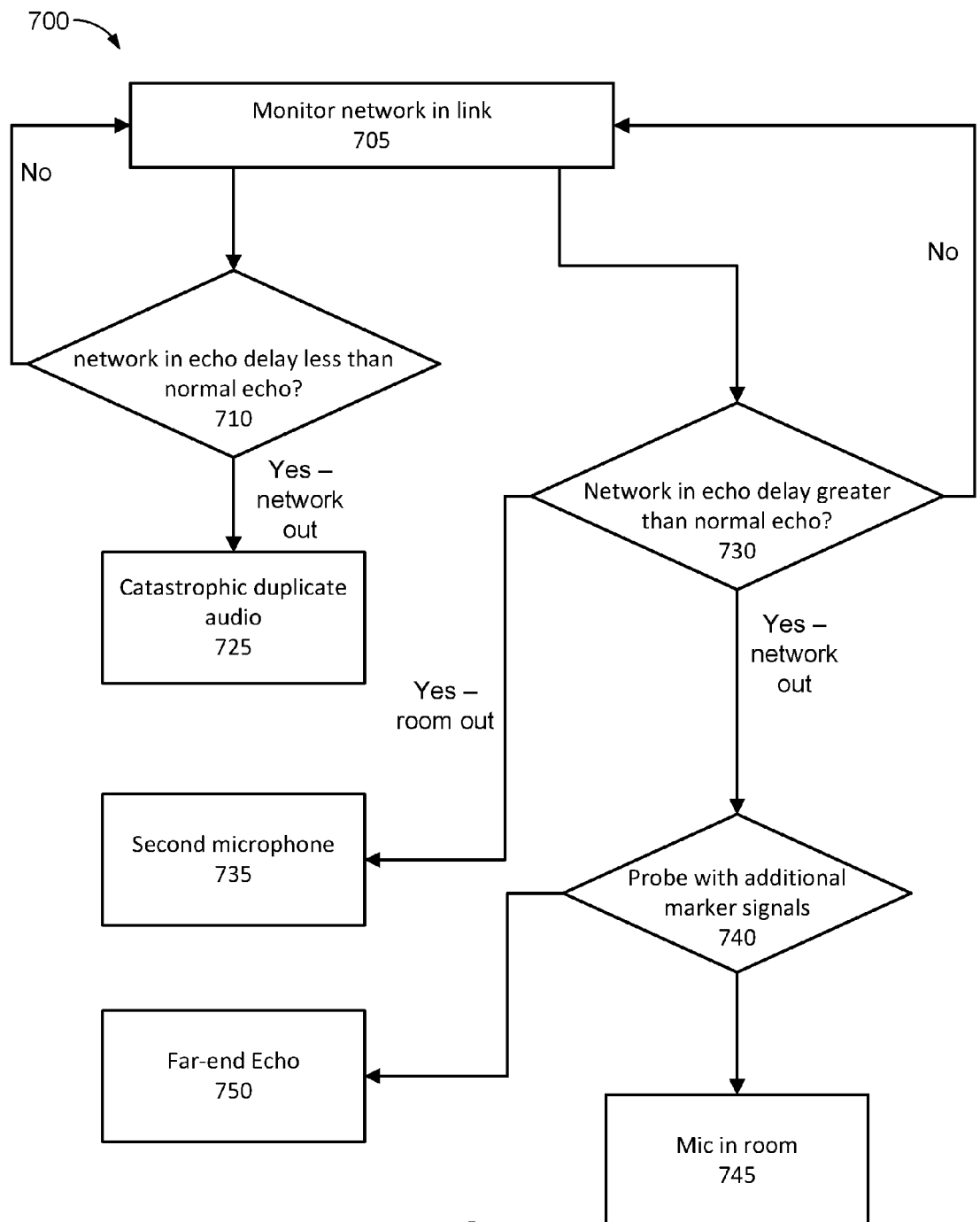
FIG. 7 shows a flow diagram for a method for determining which case, of a plurality of cases, corresponds to detected duplicate audio in an embodiment.

FIGS. 6 and 7 show flow diagrams 600 and 700 respectively for methods for determining which case, of a plurality of cases, corresponds to detected duplicate audio in an embodiment. As shown in method 600, audio system controller 505 may monitor the RI link at step 605 after injection of a marker signal in the room out link 515. When the room in echo delay is less than 100 ms (i.e., is less than an expected normal echo) at 610, for either the room out audio signal or the network out audio signal, different cases of the plurality of cases may be identified as applicable to the detected duplicated audio. For example, an echo delay for the RO audio less than the expected normal echo may be detected and associated with an excess echo case at step 620. An echo delay for the NO audio less than the expected normal echo may be detected and associated with a catastrophic recycling sound case at step 625. Likewise, when the room in echo delay is greater than 300 ms (i.e., is greater than an expected normal echo) at 630, for either the room out audio signal or the network out audio signal, different cases of the plurality of cases may be identified as applicable to the detected duplicated audio. For example, an echo delay for the RO audio greater than the expected normal echo may be detected and associated with a late echo case at step 635. An echo delay for the NO audio later than the expected normal echo may be detected and associated with another speaker in the conference room at step 640.

As shown in FIG. 7, method 700 is similar to method 600, except instead of probing the room in link, the network in link is probed with marker signals. As shown in method 700, audio system controller 505 may monitor the NI link at step 705 after injection of a marker signal in the network out link 520. When the network in echo delay is less than 100 ms (i.e., is less than an expected normal echo) at 710, for the network out audio signal (since, as noted in Table 1, it is implausible for this situation to occur in the room out link), the situation is associated with a catastrophic duplicate audio case at step 725. Likewise, when the network in echo delay is greater than 300 ms (i.e., is greater than an expected normal echo) at 730, for either the room out audio signal or the network out audio signal, different cases of the plurality of cases may be identified as applicable to the detected duplicated audio. For example, an echo delay for the RO audio greater than the expected normal echo may be detected and associated with a second microphone case at step 735. When an echo delay for the NO audio later than the expected normal echo is detected at 740, there are two possible cases, necessitating a second probe with additional marker signals. A marker signal from NO→NI will probe for a far-end echo case 750, which the audio system controller 505 cannot directly control. By contrast, a marker signal from RO→NI will test for a microphone in room case 745, which can be ameliorated by the audio system controller 505.

Figure 8:
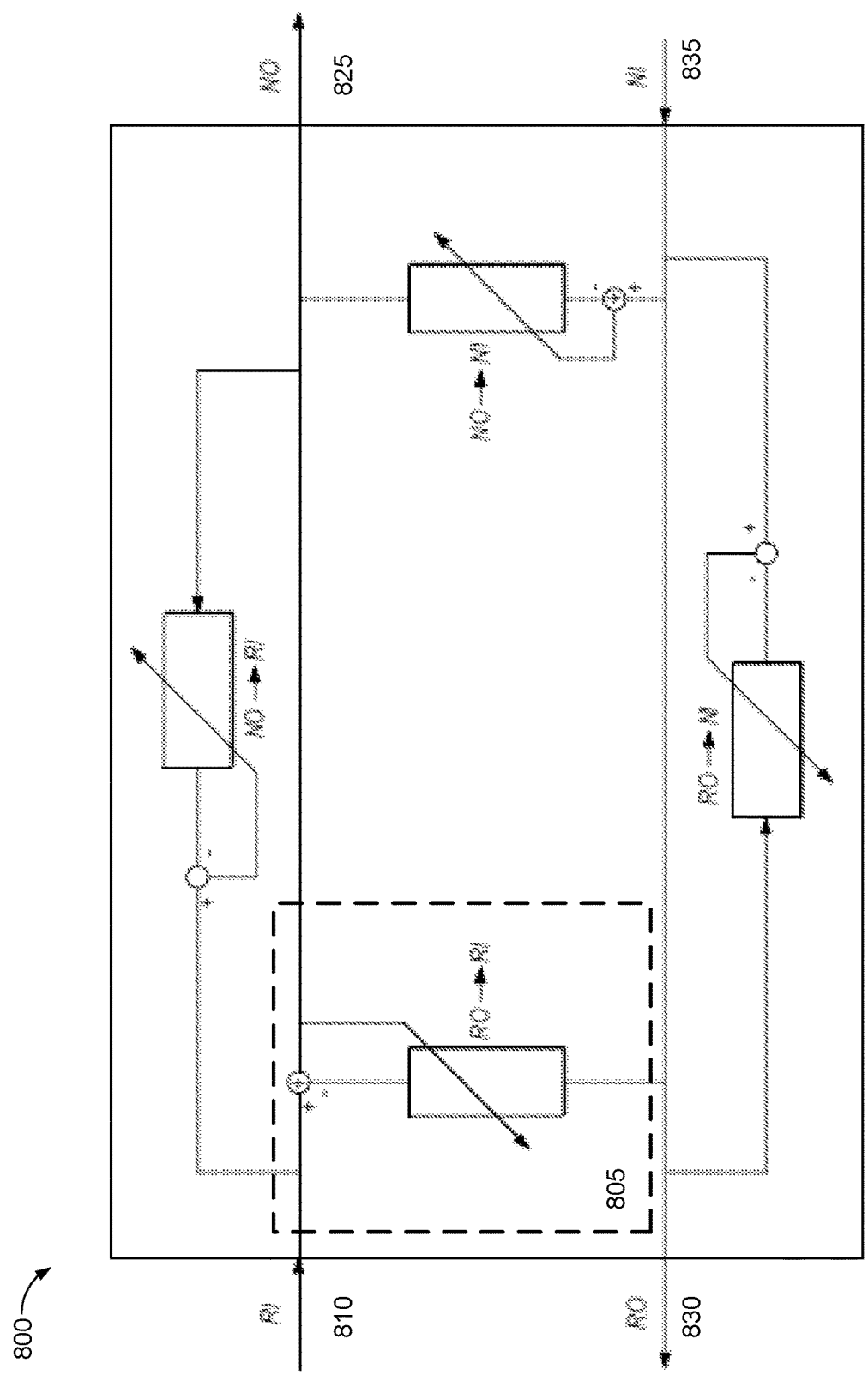
FIG. 8 is a block diagram of an exemplary system for identifying a feedback path using an adaptive filter, in an embodiment.

FIG. 8 is a block diagram of an exemplary system 800 for identifying a feedback path using an adaptive filter, in an embodiment. System 800 may be an audio system controller 505, for example. As is shown in system 800, four adaptive filters (cancellation or suppression) are provided for a single conference connection to a single room in an embodiment, one filter for each of the RI 810, RO 830, NO 825, and NI 835 links. Generally, the RO→RI adaptive filter 805 is also modifying the signal to remove the expected acoustic echo (e.g., feedback 530 in FIG. 5).

Figure 9:
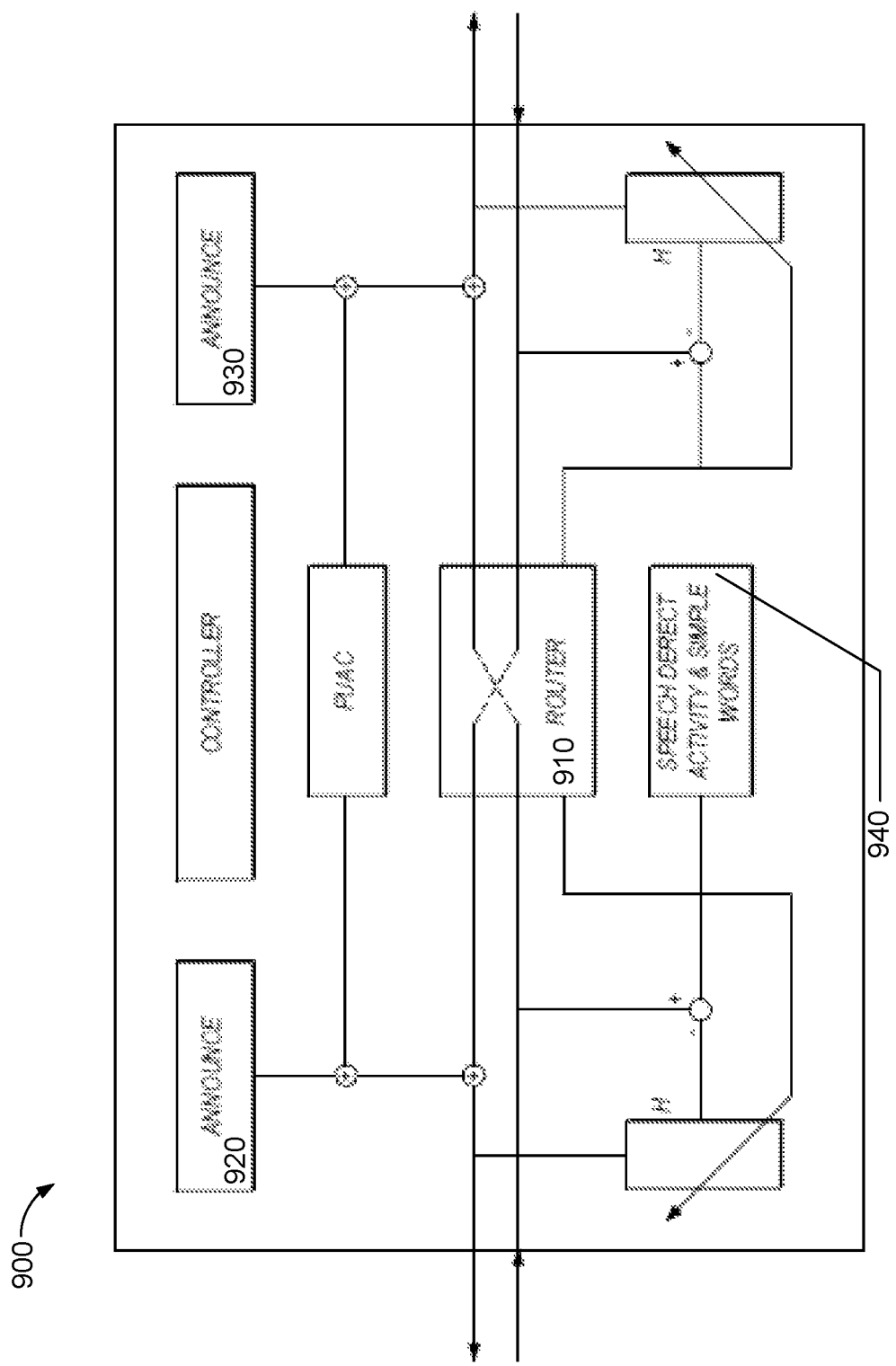
FIG. 9 is a block diagram of an exemplary system for identifying a feedback path using an adaptive filter, in an embodiment.
Figure 10:
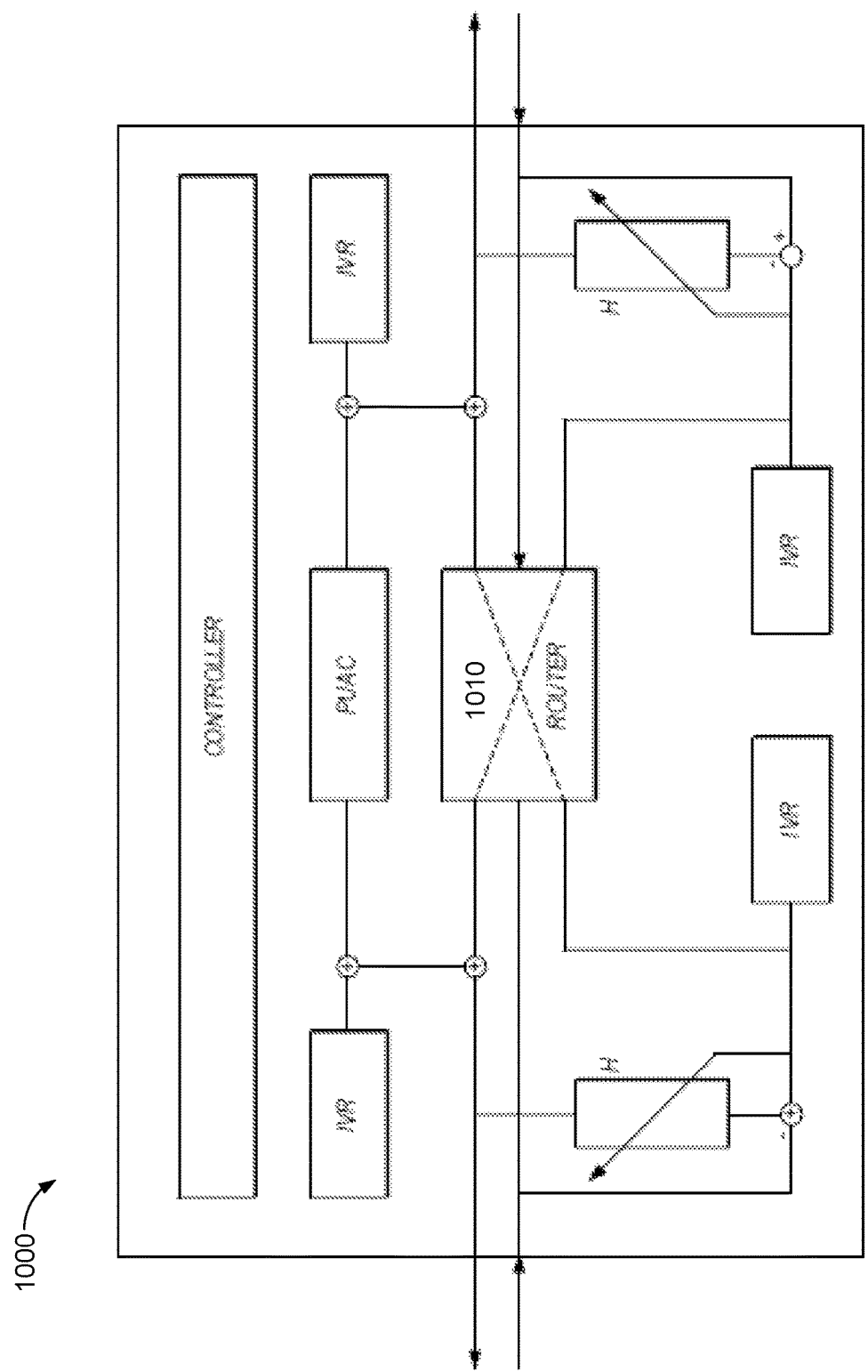
FIG. 10 is a block diagram of an exemplary system for identifying a feedback path using an adaptive filter, in an embodiment.

FIG. 9 is a block diagram of an example system 900 for identifying a feedback path using an adaptive filter, in an embodiment. FIG. 10 is a block diagram of an example system 1000 for identifying a feedback path using an adaptive filter, in an embodiment. In each schematic of systems 900 and 1000, the components of the adaptive filters for normal acoustic (and line) and echo reduction (H) are shown. System 900 and system 1000 also display a routing block (910 and 1010 respectively) that manage the cross paths of audio between the inputs and outputs. The router block is able to largely attenuate or block the audio paths between the conference room and the connected conference.

Two variants are presented with slightly differing aspects of the integrated voice response (IVR) modules in FIGS. 9 and 10. System 900 has the ability to create test stimulus and/or voice announcements on both of the audio sends (into the room and out to the network) via announce blocks 920 (for announcements in the room) and 930 (for announcements to the network). In addition system 900 shows a system 940 for detecting speech from the local input after the acoustic echo cancellation is applied.

The embodiment shown in system 1000 displays a more comprehensive approach, where a sophisticated interactive voice response (IVR) system is available at both sides of the audio control and therefore able to provide information and respond to voice from either side.

In FIG. 10, the IVR blocks represent an interactive Voice Response system, or more specifically as shown in this case, the ability to create a Voice Message—via a text to speech conversion, or perhaps more generally something that is able to play suitable audio as an indication of the particular condition or fault mode extant, and additionally is able to locate and interpret for simple verbal responses.

In FIG. 10, the upper IVR is the block that would add into the outgoing signal for example "Please note, the far end party is experiencing audio difficulties and is currently muted.", or "Please not that you have enabled an additional device in the room connected to the same conference. Please mute that device. The room has been muted until this feedback path is removed."

The lower IVR is the block that receives the input and can parse or look for voice responses from the room. For example, if the played out audio from the upper IVR was ("Would you like to unmute your microphone") then the lower IVR would be looking for a "Yes" or "No".

The upper and lower IVR blocks in FIG. 10 are two halves of two IVRS—one for each side. The left IVR is responsible for the voice prompts and looking for the returns from the room, which is the primary value. The other IVR on the right side of FIG. 10 has a similar function but out to the rest of the conference—therefore it is often more of a Voice Prompt (output) than having a requirement for the input (Voice Response Check).

The Controller block in FIG. 10 represents the general idea that some logic (as described in the examples and tables) is observing the state, and controlling the actions of the other modules. For example, the Controller may be observing the general signal levels through the router and the behaviour of the echo cancellation/suppression systems. If the Controller sees the start of a circulating sound, and the rapid increased reaction of the echo system to delayed loop back audio, it may choose a strategy such as:

Mute the room microphone and lower the room speaker (using the routing)
Check if the build-up of activity reduced when muting and lowering room output (determine if the problem is local or remote)
Send a probe signal into the room, to see if that has both local echo, and additional echo coming back in from the network (an extra microphone in the room)
Send a probe signal out into the conference, to see if that has a return coming back into the room (an extra device outputting from the conference (loudspeaker device) in the room)
Based on the above, play an appropriate scripted IVR and possible confirmation response—include instructions or trouble shooting advice
Repeat the probe test to determine if the fault has been removed
Unmute microphone and return speaker output level in the room The Controller therefore has links into all of the other modules. These are bi-directional:

It can detect levels or alter gains in the router
It can observe the filter level, and freeze or force adaptation of the echo system (reset it for example)
It can trigger messages or voice prompt sequences to be sent by the output IVR, and await for state transitions or voice responses from the input IVR For simplicity of the figure, these links are not shown. So the Controller is a omnipotent supervisor for the other modules—the control logic.

Returning to the detecting duplicated audio step 110 of method 100, a reliable system probe of a given path may be described as follows. First, the current state of the adaptive filter for the given probe path may be stored in memory. The state of the adaptive filter may subsequently be reset, and any audio output temporarily on other outputs from the ISAMS may be eliminated. A characteristic marker pulse may be transmitted on the link being tested, the marker pulse having a suggested length of 200-1000 ms. Examples of marker pulses may include noise bursts, a tone or frequency sweep, a less annoying (to conference attendees) and compact chirp, a known and suitably entropic chime or conference sound, a specific voice for testing, and any combination of the foregoing examples. Generally, the best signals will be short, high contrast and unlike the current cycling noise or voice.

The adaptive filter on the tested line may be applied with a suitable adaptation time constant to detect reliably the presence of return echo on the one or more monitored paths. Once this has occurred, the adaptive filter can be analyzed and compared to the stored state of the adaptive filter to determine if a) there is echo or feedback present on this path, and b) the echo is larger or smaller than the current state of the adaptive filter. If the echo identified is substantially smaller than that on the adaptive filter, it suggests the adaptive filter has been mislead by circulating sound in a loop path.

To maintain connection with the conference during the modifying playback and/or capture settings of the system, system 800 may be modified, in an embodiment, such that each adaptive filter can additionally control or modulate the signal path in the form of an adaptive suppressive filter. In the extreme case, where there is identified problematic echo or feedback, the adaptive filter can operate in the form of a duplex modulation scheme which alternates and will only allow audio flow in a single direction. Depending on the modified operation of the conferencing system, the audio system controller continues to monitor the signals which have been disconnected. For example, when the system controller detects another device is enabled in the room, any audio in the room (RI) is also seen by the audio system controller on the network (NI) since the additional endpoint is broadcasting the room audio. If there is at a later time audio in the room that is not being received by the conference, then either the users have muted the additional device, or it is somehow failing to connect the conference room to the conference over the network (e.g., connection dropped, device turned off). An announcement may be provided, in some embodiments, with even a voice response (e.g., asking the user "do you want to unmute the ISAMS connection to the conference").

Figure 11:
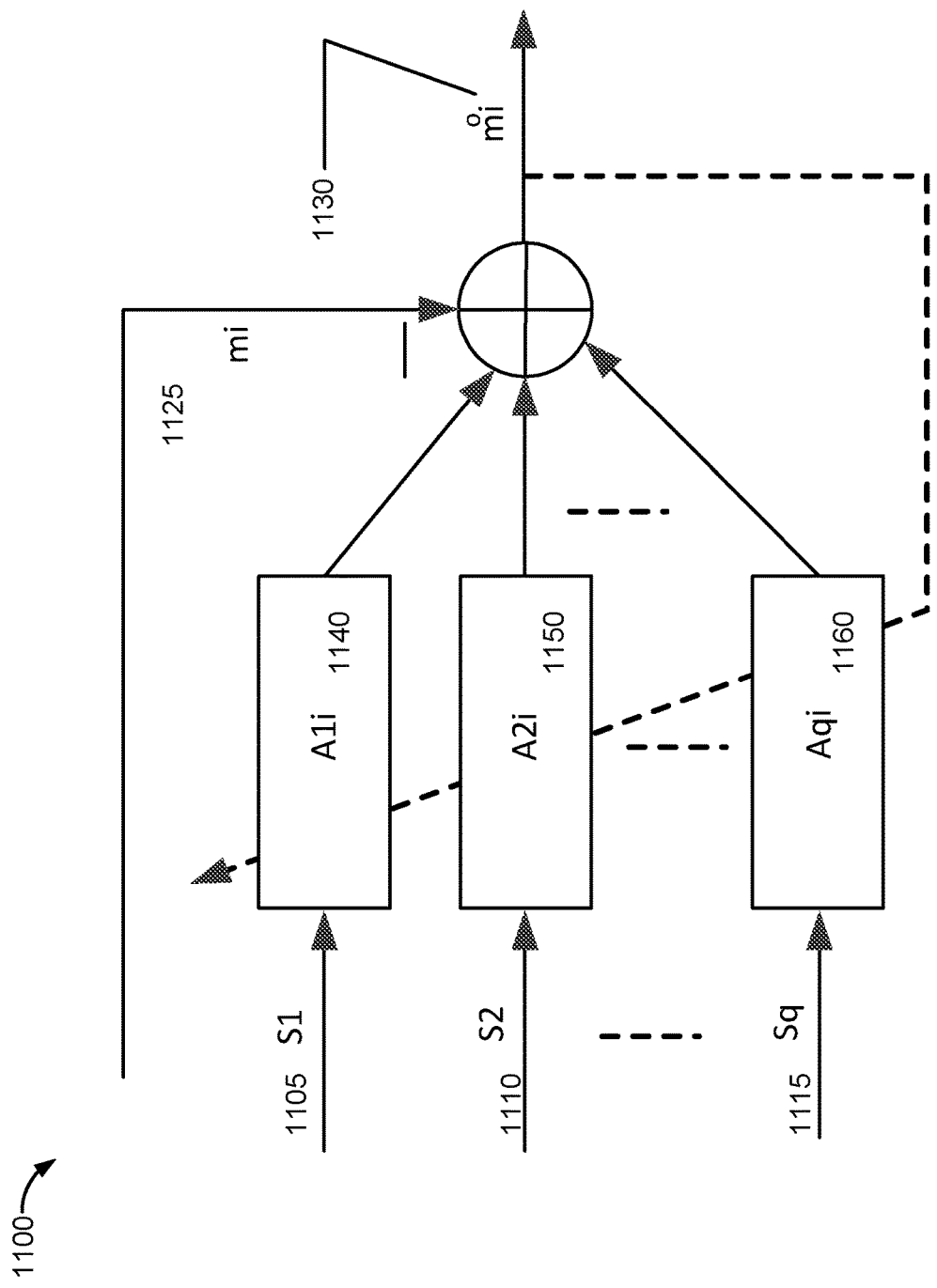
FIG. 11 is a block diagram illustrating detecting presence of duplicated audio, in an embodiment.

While the foregoing has detailed the situation where a single network link is provided to a conferencing system that has control over a single microphone, more complex conferencing systems may also be used with the described audio system controller. For example, FIG. 11 is a block diagram illustrating detecting presence of duplicated audio in a system 1100 having multiple speakers and multiple microphones, in an embodiment.

When the proposed system can obtain the playout and microphone signals of all the communication systems within the room, the audio system controller can monitor the signal activities within these channels and identify potential correlation between the channels. Thus, the audio system controller can suppress/clean unwanted signals that are caused due to multiple feedbacks between different communication devices. As illustrated in the system 1100, the speakers signals are represented as s1 1105, s2 1110 . . . sq 1115 whereas the microphone system are denoted as m1, m2, . . . mp, respectively. The detection and suppression block (e.g., DUAC 345 in FIG. 3) may detect duplicated audio by finding any potential correlations between s= [s1 s2 . . . sq]$^T$ and m=[m1 m2 . . . mp]$^T$. Written in a matrix form, the correlation can be expressed as:

$$C_{ms} = s^T m = \begin{bmatrix} s1m1 & \ldots & s1mp \\ \vdots & \ddots & \vdots \\ sqm1 & \ldots & sqmp \end{bmatrix} \quad (1)$$

It is obvious from the above equation that if there is certain undesirable feedback between any pair of speaker and microphone (in most cases speakers and microphones of different audio devices), the whole audio experience will likely be degraded due to the absence of feedback cancellation or suppression. To mitigate this problem, the proposed system can adapt the idea of multi-channel adaptive filtering for removing strong correlation that sits in the microphone signals. The ideal cleaned microphone signals, denoted as m$^o$=[m$^o$1 m$^o$2 . . . m$^o$p]$^T$, should therefore be minimized in terms of the power as $$|m^o|^2 = \Sigma_{i=1}^p |m^o i|^2 \quad (2)$$

The above equation can be minimized with respect to each microphone signal as they are assumed to be independent of each other. For instance, as depicted in the following figure, an adaptive associated with the ith microphone takes in a linear combination of all the speakers and tries to approximate the microphone signal. The difference signal, denoted as m$^o$i, may be used to update the coefficients of the linear system as represented by $A_i$=[$A_{1i}$ $A_{2i}$ . . . $A_{qi}$]$^T$. It should be denoted that the coefficients $A_i$ are generally in a matrix form, with each row being a filter that characterize the feedback path from a certain speaker to the ith microphone. The adaptation algorithm for updating these filter coefficients can be least mean squares (LMS) based algorithms or any other suitable algorithm.

In another embodiment, the system can prompt the users to disable problematic feedback path by either disabling some speakers or microphones or the combined parts of them, once certain problematic feedback paths are identified. Such paths are usually formed between speakers and microphones on different devices. Thus, by estimating the strengths of such paths, decision of whether to notify the users of such actions can be made. Specifically, it is assumed, in an embodiment, that the strength of the estimated feedback path is the absolute value of the coefficients of the adaptive filters 1140, 1150, and 1160 in system 1100, e.g., |A1i|, |A2i| . . . |Aqi|.

Figure 12:
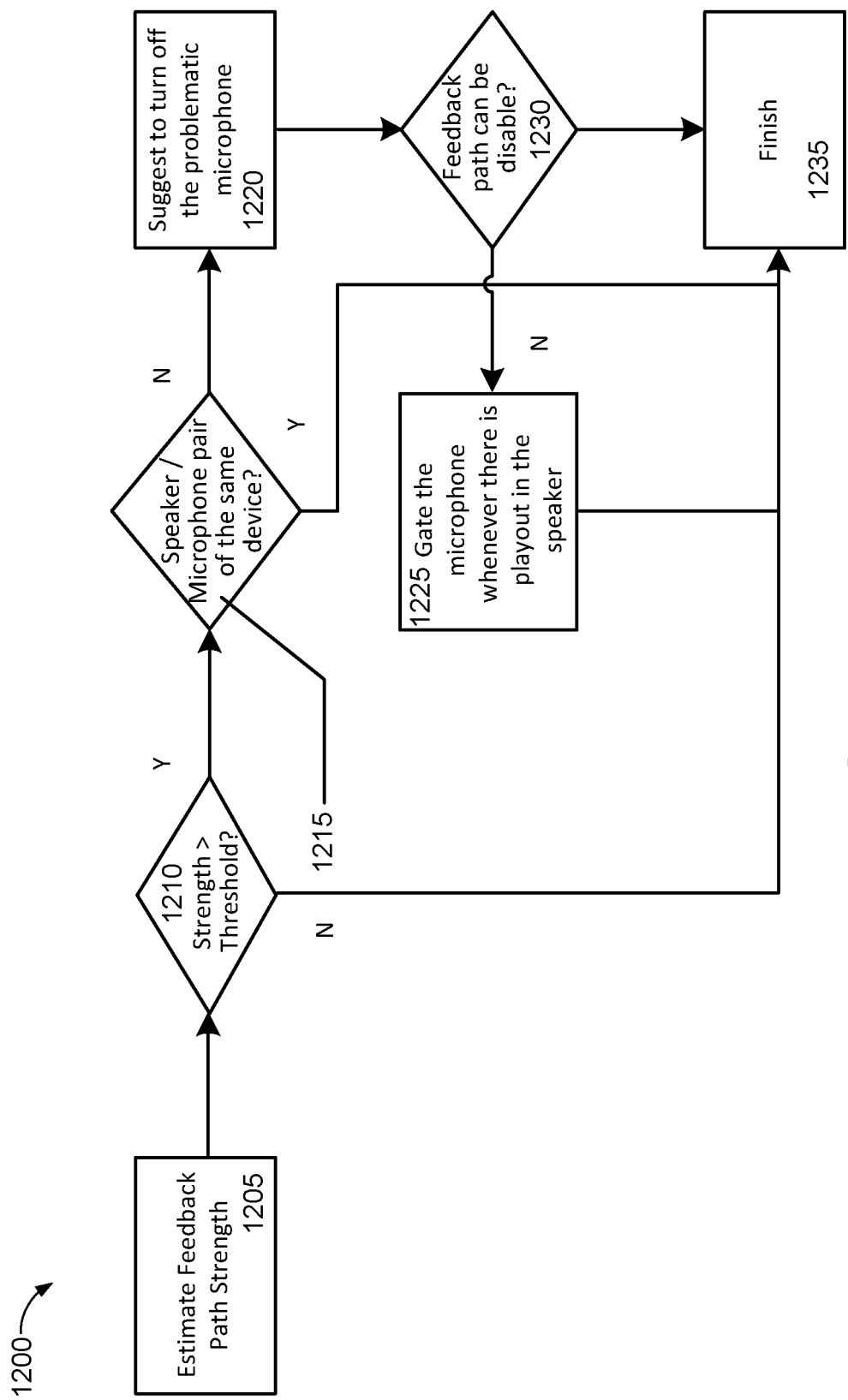
FIG. 12 shows a flow diagram for prompting users to disable problematic feedback paths based on a determined case, in an embodiment.

FIG. 12 shows a flow diagram for method 1200, which prompts users to disable problematic feedback paths based on a determined case, in an embodiment. As illustrated in FIG. 12, the feedback path strength is estimated by using the assumption above in step 1205. If the strength exceeds certain threshold (e.g., −10 dB) at 1210, a significant feedback path is assumed to exist. Additionally, if such a path represents a speaker/microphone pair that does not belong to the same device at 1215, it is determined to be a problematic feedback path. The audio system controller may then prompt the users to disable either the microphone or the speaker to cut off the feedback path at step 1220. If such action is not available at 1230, the audio system controller may enter a more aggressive mode by turning the microphone into a half-duplex mode at step 1225, meaning whenever the speaker is playing out sound, the microphone signal is muted. Such strategies can prevent the whole system from going into an unstable state, such as howling.

Where there is a loop detected and an action to break that audio link, it may be that this leads to groups that wish to be in communication that can no longer hear each other. In the cases of this being a possibility, one embodiment includes the idea of having a mediation approach. In particular, where the use of IVR is appropriate (noting other UI or tone could work though IVR is an easy audio only implementation), the audio system controller may send an audio message to the conference room saying—"This line has been muted in order to prevent audio problems and you no longer can be heard." If the audio system controller detects what looks like audio activity or desire to talk where it has muted itself, then it may send an audio message to the conference room saying "Are you wanting to break in or talk to this room?" The audio system controller may then wait for a positive response.

In another embodiment, on detecting the presence of echo, the system may send an audio message to the conference room saying "The room microphone has been muted. It appears another device in the room is also connected to the conference." In further embodiments, on detecting that room audio being sent to the conference is causing echo, the audio system controller may send an audio message to the conference room saying "Your microphone has been muted. There is a large echo return from the conference over the network."

Figure 13:
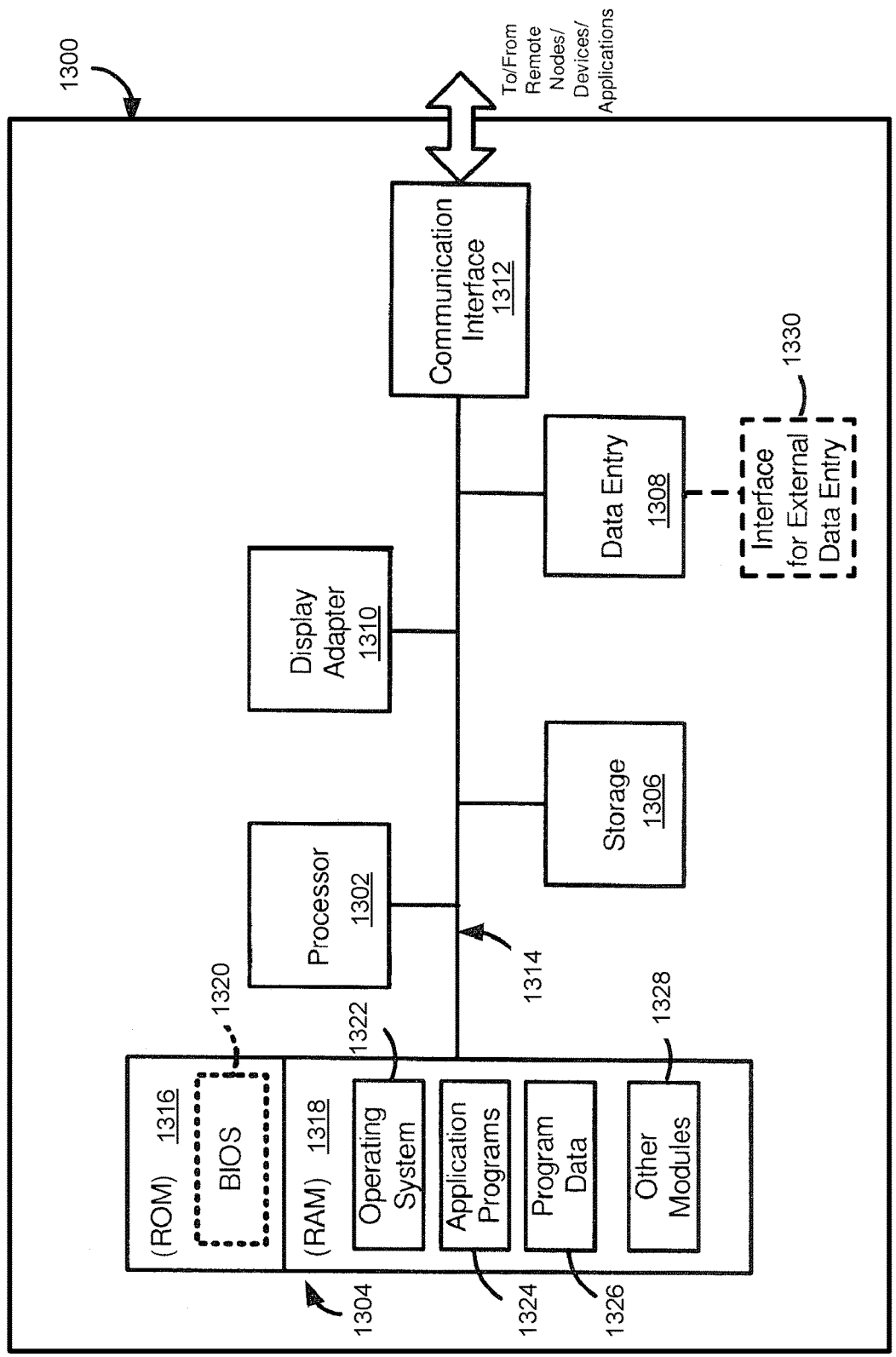
FIG. 13 is a block diagram of an exemplary system for modifying far-end signal playback on an audio device, in an embodiment.

FIG. 13 is a block diagram of an exemplary system for modifying far-end signal playback on an audio device, in various embodiments. With reference to FIG. 13, an example system for implementing the subject matter disclosed herein, including the methods described above, includes a hardware device 1300, including a processing unit 1302, memory 1304, storage 1306, data entry module 1308, display adapter 1310, communication interface 1312, and a bus 1314 that couples elements 1304-1312 to the processing unit 1302.

The bus 1314 may comprise any type of bus architecture. Examples include a memory bus, a peripheral bus, a local bus, etc. The processing unit 1302 is an instruction execution machine, apparatus, or device and may comprise a microprocessor, a digital signal processor, a graphics processing unit, an application specific integrated circuit (ASIC), a field programmable gate array (FPGA), etc. The processing unit 1302 may be configured to execute program instructions stored in memory 1304 and/or storage 1306 and/or received via data entry module 1308.

The memory 1304 may include read only memory (ROM) 1316 and random access memory (RAM) 1318. Memory 1304 may be configured to store program instructions and data during operation of device 1300. In various embodiments, memory 1304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 1304 may also include nonvolatile memory technologies such as nonvolatile flash RAM (NVRAM) or ROM. In some embodiments, it is contemplated that memory 1304 may include a combination of technologies such as the foregoing, as well as other technologies not specifically mentioned. When the subject matter is implemented in a computer system, a basic input/output system (BIOS) 1320, containing the basic routines that help to transfer information between elements within the computer system, such as during start-up, is stored in ROM 1316.

The storage 1306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 1300.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 1306, ROM 1316 or RAM 1318, including an operating system 1322, one or more applications programs 1324, program data 1326, and other program modules 1328. A user may enter commands and information into the hardware device 1300 through data entry module 1308. Data entry module 1308 may include mechanisms such as a keyboard, a touch screen, a pointing device, etc. Other external input devices (not shown) are connected to the hardware device 1300 via external data entry interface 1330. By way of example and not limitation, external input devices may include a microphone, joystick, game pad, satellite dish, scanner, or the like. In some embodiments, external input devices may include video or audio input devices such as a video camera, a still camera, etc. Data entry module 1308 may be configured to receive input from one or more users of device 1300 and to deliver such input to processing unit 1302 and/or memory 1304 via bus 1314.

The hardware device 1300 may operate in a networked environment using logical connections to one or more remote nodes (not shown) via communication interface 1312. The remote node may be another computer, a server, a router, a peer device or other common network node, and typically includes many or all of the elements described above relative to the hardware device 1300. The communication interface 1312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 1312 may include logic configured to support direct memory access (DMA) transfers between memory 1304 and other devices.

In a networked environment, program modules depicted relative to the hardware device 1300, or portions thereof, may be stored in a remote storage device, such as, for example, on a server. It will be appreciated that other hardware and/or software to establish a communications link between the hardware device 1300 and other devices may be used.

It should be understood that the arrangement of hardware device 1300 illustrated in FIG. 13 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 1300. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 13. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter may be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

In the description above and throughout, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of the preferred an embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

Various aspects of the present invention may be appreciated from the following enumerated example embodiments (EEEs):

EEE 1. A method for analyzing and resolving feedback caused by having multiple audio links in a conference room, the method comprising the steps of:
  detecting, by an audio system coupled to a speaker and a microphone, presence of duplicated audio caused by multiple audio links in the conference room;
  injecting, in response to the detecting the duplicated audio, marker signals;
  receiving an echo of the marker signals;
  determining which case, of a plurality of cases, corresponds to the detected duplicated audio based on the received echo of the marker signals;
  modifying operation of at least one of the speaker and the microphone based on the determined case corresponding to the detected duplicated audio; and
  monitoring audio playback in the conference room to verify that far end audio playback is taking place and that the duplicated audio has been resolved.

EEE 2. The method of EEE 1, further comprising informing users of the audio system about the determined case.

EEE 3. The method of EEE 1 or EEE 2, further comprising suggesting user actions to remedy the duplicated audio.

EEE 4. The method of any of EEEs 1-3, the injected marker signals being played over both audio and network paths.

EEE 5. The method of any of EEEs 1-4, further comprising, in response to the detecting the duplicated audio, turning off at least one of the speaker and the microphone, wherein the modifying operation comprises determining whether to turn on a component that has been previously turned off, and turning on the component that has been previously turned off based on the determination.

EEE 6. The method of any of EEEs 1-5, wherein the modifying operation comprises applying adaptive suppressive filters to an output played through the speaker, the adaptive suppressive filters lowering the volume such that audio may still be heard.

EEE 7. The method of any of EEEs 1-6, the detecting presence of duplicated audio comprising identifying high correlation between two detected audio signals in the conference room.

EEE 8. The method of any of EEEs 1-7, the determining which case of the plurality of cases comprising determining an amount of delay between the injecting the marker signals and detecting a far end version of the injected marker signals using the microphone in the conference room.

EEE 9. The method of any of EEEs 1-8, further comprising:
detecting, during the monitoring audio playback, that received far end activity is not being heard in the conference room;
undoing the modified operation of the one of the speaker and the microphone; and
announcing to users via the speaker that the modified operation has been canceled.

EEE 10. An audio system controller comprising,
a room port including a room input link and a room output link;
a network port including a network input link and a network output link; and
an audio routing controller communicatively coupled to both the room port and the network port, the audio routing controller comprising a processor that receives an incoming audio stream via the network input link and outputs the audio stream via the room output link, the processor being configured to:
detect duplicate audio in a conference room via the room input link;
inject, using the room output link, marker signals into the conference room;
receive the injected marker signals via the room input link;
determine, based on the received marker signals, which case of a plurality of cases corresponds to the detected duplicate audio;
modify operation of the room port based on the determined case corresponding to the detected duplicated audio; and
monitor audio playback in the conference room to verify that far end audio playback is taking place and that the duplicated audio has been resolved.

EEE 11. The audio system controller of EEE 10, the determining which case of the plurality of cases comprising determining an amount of delay between the injecting the marker signals and detecting the injected marker signals using one of the room input link and the network input link.

EEE 12. The audio system controller of EEE 11, wherein when the delay between a room out marker signal and the room input signal is less than 100 ms, the case is another speaker being in the conference room, and the modification is turning off the room port.

EEE 13. The audio system controller of EEE 11 or 12, wherein when the delay between a room out marker signal and the room input signal is greater than 300 ms, the case is an independent feedback loop, and the modification is turning off the room input link of the room port.

EEE 14. The audio system controller of any of EEEs 11-13, wherein when the delay between a room out marker signal and the network input signal is greater than 200 ms, the case is another microphone being in the conference room, and the modification is turning off the room port.

EEE 15. The audio system controller of any of EEEs 11-14, wherein when the delay between a network out marker signal and the room input signal is less than 100 ms, the case is catastrophic duplicate audio, and the modification is muting the room in link and the room out link.

EEE 16. The audio system controller of any of EEEs 11-14, wherein when the delay between a network out marker signal and the room input signal is greater than 200 ms, the case is another speaker in the conference room, and the modification is muting the room out link.

EEE 17. The audio system controller of any of EEEs 11-16, wherein when the delay between a network out marker signal and the network input signal is less than 100 ms, the case is catastrophic duplicate audio, and the modification is muting the room in link and the room out link.

EEE 18. The audio system controller of any of EEEs 11-17, wherein when the delay between a network out marker signal and the room input signal is greater than 200 ms, second marker signals are injected, the second marker signals comprising a room out probe to the network in link.

The invention claimed is:

1. A method for analyzing and resolving feedback caused by having multiple audio links in a conference room, the method comprising the steps of:
detecting, by an audio system coupled to a speaker and a microphone, presence of duplicated audio caused by multiple audio links in the conference room;
injecting, in response to the detecting the duplicated audio, marker signals in one of a room output link and a network output link;
receiving an echo of the marker signals via one of a room input link and a network input link;
determining which case, of a plurality of cases, corresponds to the detected duplicated audio based on the received echo of the marker signals, comprising determining an amount of delay between the injecting the marker signals and detecting the injected marker signals using one of the room input link and the network input link;
modifying operation of at least one of the speaker and the microphone based on the determined case corresponding to the detected duplicated audio; and
monitoring audio playback in the conference room to verify that far end audio playback is taking place and that the duplicated audio has been resolved.

2. The method of claim 1, further comprising informing users of the audio system about the determined case.

3. The method of claim 1, further comprising suggesting user actions to remedy the duplicated audio.

4. The method of claim 1, further comprising, in response to the detecting the duplicated audio, turning off at least one of the speaker and the microphone, wherein the modifying operation comprises determining whether to turn on a component that has been previously turned off, and turning on the component that has been previously turned off based on the determination.

5. The method of claim 1, wherein the modifying operation comprises applying adaptive suppressive filters to an output played through the speaker, the adaptive suppressive filters lowering the volume such that audio may still be heard.

6. The method of claim 1, the detecting presence of duplicated audio comprising identifying high correlation between two detected audio signals in the conference room.

7. The method of claim 1, further comprising:
detecting, during the monitoring audio playback, that received far end activity is not being heard in the conference room;
undoing the modified operation of the one of the speaker and the microphone; and announcing to users via the speaker that the modified operation has been canceled.

8. An audio system controller comprising,
a room port including a room input link and a room output link;
a network port including a network input link and a network output link; and
an audio routing controller communicatively coupled to both the room port and the network port, the audio routing controller comprising a processor that receives an incoming audio stream via the network input link and outputs the audio stream via the room output link, the processor being configured to:
detect duplicate audio in a conference room via the room input link;
inject marker signals in one of the room output link and the network output link;
receive the injected marker signals via one of the room input link and the network input link;
determine, based on the received marker signals, which case of a plurality of cases corresponds to the detected duplicate audio, comprising determining an amount of delay between the injecting the marker signals and detecting the injected marker signals using one of the room input link and the network input link;
modify operation of the room port and/or network port based on the determined case corresponding to the detected duplicated audio; and
monitor audio playback in the conference room to verify that far end audio playback is taking place and that the duplicated audio has been resolved.

9. The audio system controller of claim 8, wherein when the delay between a room out marker signal and the room input signal is less than 100 ms, the case is another speaker being in the conference room, and the modification is turning off the room port.

10. The audio system controller of claim 8, wherein when the delay between a room out marker signal and the room input signal is greater than 300 ms, the case is an independent feedback loop, and the modification is turning off the room input link of the room port.

11. The audio system controller of claim 8, wherein when the delay between a room out marker signal and the network input signal is greater than 200 ms, the case is another microphone being in the conference room, and the modification is turning off the room port.

12. The audio system controller of claim 8, wherein when the delay between a network out marker signal and the room input signal is less than 100 ms or the delay between a network out marker signal and the network input signal is less than 100 ms, the case is catastrophic duplicate audio, and the modification is muting the room in link and the room out link.

13. The audio system controller of claim 8, wherein when the delay between a network out marker signal and the room input signal is greater than 200 ms, the case is another speaker in the conference room, and the modification is muting the room out link.

14. The audio system controller of claim 8, wherein when the delay between a network out marker signal and the room input signal is greater than 200 ms, second marker signals are injected, the second marker signals comprising a room out probe to the network in link.

15. A computer program product for analyzing and resolving feedback caused by having multiple audio links in a conference room, the computer program product being tangibly stored on a non-transient computer-readable medium and comprising machine executable instructions which, when executed, cause the machine to perform steps of:
detecting presence of duplicated audio caused by multiple audio links in the conference room;
injecting, in response to the detecting the duplicated audio, marker signals in one of a room output link and a network output link;
receiving an echo of the marker signals via one of a room input link and a network input link;
determining which case, of a plurality of cases, corresponds to the detected duplicated audio based on the received echo of the marker signals, comprising determining an amount of delay between the injecting the marker signals and detecting the injected marker signals using one of the room input link and the network input link;
modifying operation of at least one of a speaker and a microphone based on the determined case corresponding to the detected duplicated audio; and
monitoring audio playback in the conference room to verify that far end audio playback is taking place and that the duplicated audio has been resolved.

16. The computer program product of claim 15, the machine executable instructions further causing the machine to perform the step of informing users of the audio system about the determined case.

17. The computer program product of claim 15, the machine executable instructions further causing the machine to perform the step of suggesting user actions to remedy the duplicated audio.

18. The computer program product of claim 15, the machine executable instructions further causing the machine to perform the step of, in response to the detecting the duplicated audio, turning off at least one of the speaker and the microphone, wherein the modifying operation comprises determining whether to turn on a component that has been previously turned off, and turning on the component that has been previously turned off based on the determination.

19. The computer program product of claim 15, wherein the modifying operation comprises applying adaptive suppressive filters to an output played through the speaker, the adaptive suppressive filters lowering the volume such that audio may still be heard.

20. The computer program product of claim 15, the detecting presence of duplicated audio comprising identifying high correlation between two detected audio signals in the conference room.

* * * * *